US008563116B2

(12) United States Patent
Finn et al.

(10) Patent No.: US 8,563,116 B2
(45) Date of Patent: Oct. 22, 2013

(54) FUSER MANUFACTURE AND APPARATUS

(75) Inventors: Patrick J. Finn, Webster, NY (US); Kenneth R. Rasch, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 409 days.

(21) Appl. No.: 12/874,725

(22) Filed: Sep. 2, 2010

(65) Prior Publication Data

US 2012/0058300 A1 Mar. 8, 2012

(51) Int. Cl.

| | |
|---|---|
| ***B32B 7/02*** | (2006.01) |
| ***B32B 15/04*** | (2006.01) |
| ***B32B 15/06*** | (2006.01) |
| ***B32B 15/08*** | (2006.01) |
| ***B32B 15/18*** | (2006.01) |
| ***B32B 25/08*** | (2006.01) |
| ***B32B 25/20*** | (2006.01) |
| ***B32B 27/16*** | (2006.01) |
| ***B32B 27/20*** | (2006.01) |
| ***B32B 27/28*** | (2006.01) |
| ***G03G 15/20*** | (2006.01) |

(52) U.S. Cl.

USPC ........ 428/141; 428/421; 428/422; 428/425.5; 428/446; 428/447; 428/448; 428/450; 428/451; 428/457; 428/461; 428/463; 428/473.5; 492/53; 427/331; 427/334; 399/320; 399/324; 399/328; 399/329; 399/330; 399/361; 430/124.1; 430/124.32; 430/124.33; 430/124.34; 430/124.35; 430/124.37

(58) Field of Classification Search

None

See application file for complete search history.

(56) References Cited

U.S. PATENT DOCUMENTS

| | | | | |
|---|---|---|---|---|
| 3,908,589 | A * | 9/1975 | Bar-on | 118/60 |
| 3,924,564 | A * | 12/1975 | Bar-on | 118/60 |
| 4,029,827 | A * | 6/1977 | Imperial et al. | 430/124.37 |
| 4,196,256 | A * | 4/1980 | Eddy et al. | 428/422 |
| 5,291,257 | A * | 3/1994 | Cerrah et al. | 399/333 |
| 5,395,725 | A * | 3/1995 | Bluett et al. | 430/124.34 |
| 5,411,779 | A * | 5/1995 | Nakajima et al. | 428/36.91 |
| 5,547,742 | A * | 8/1996 | Satoh et al. | 428/215 |
| 5,636,012 | A * | 6/1997 | Uneme et al. | 399/325 |
| 5,709,973 | A * | 1/1998 | Chen et al. | 430/124.33 |
| 5,729,813 | A * | 3/1998 | Eddy et al. | 399/333 |
| 5,744,241 | A * | 4/1998 | Hobson et al. | 428/422 |
| 5,763,129 | A * | 6/1998 | Chen et al. | 430/124.31 |
| 5,781,840 | A * | 7/1998 | Chen et al. | 430/124.37 |
| 5,798,181 | A * | 8/1998 | Hobson et al. | 428/422 |
| 5,906,881 | A * | 5/1999 | Chen et al. | 428/141 |
| 6,011,946 | A * | 1/2000 | Eddy et al. | 399/333 |
| 6,022,663 | A * | 2/2000 | Chen et al. | 430/124.34 |
| 6,113,830 | A * | 9/2000 | Chen et al. | 264/241 |
| 6,159,588 | A * | 12/2000 | Eddy et al. | 428/215 |
| 6,217,963 | B1 * | 4/2001 | Miyamoto et al. | 428/36.91 |
| 6,223,016 | B1 * | 4/2001 | Jia et al. | 399/327 |
| 6,261,688 | B1 * | 7/2001 | Kaplan et al. | 428/391 |
| 6,377,774 | B1 * | 4/2002 | Maul et al. | 399/325 |
| 6,479,158 | B1 * | 11/2002 | Kuntz et al. | 428/447 |
| 6,486,441 | B1 * | 11/2002 | Chen et al. | 219/216 |
| 6,829,466 | B2 * | 12/2004 | Finn et al. | 399/333 |
| 6,927,006 | B2 * | 8/2005 | Finn et al. | 430/124.35 |
| 7,381,514 | B2 * | 6/2008 | Bluett et al. | 430/124.3 |

(Continued)

*Primary Examiner* — Vivian Chen

(74) *Attorney, Agent, or Firm* — Hoffman Warnick LLC

(57) ABSTRACT

There is described a method for producing a fuser member. The method includes obtaining a substrate and positioning a fluoroplastic sleeve around the substrate. The outer surface of the fluoroplastic sleeve is roughened to a surface roughness of between about 0.03 μm Ra and about 3 μm Ra. The outer surface is coated with a functional silicone oil.

19 Claims, 1 Drawing Sheet

(56) References Cited

U.S. PATENT DOCUMENTS 7,534,492 B2 * 5/2009 Chen et al. .................... 428/421
7,682,542 B2 * 3/2010 Chen et al. .................... 264/235
2004/0028432 A1 * 2/2004 Pickering et al. ............. 399/328
2010/0055450 A1 * 3/2010 Qi et al. ........................ 428/336
2010/0086787 A1 * 4/2010 QI et al. ........................ 428/421

* cited by examiner

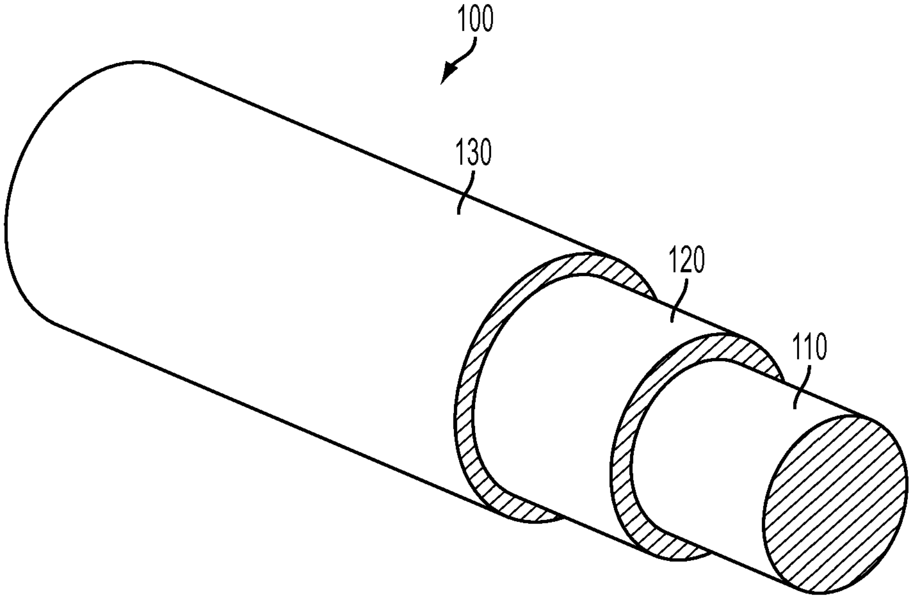
100
130
120
110

FUSER MANUFACTURE AND APPARATUS

BACKGROUND

1. Field of Use

This disclosure is generally directed to fuser members useful in electrophotographic imaging apparatuses, including digital, image on image, and the like. This disclosure also relates to processes for making and using fuser members.

2. Background

Generally, in a commercial electrophotographic marking or reproduction apparatus (such as copier/duplicators, printers, multifunctional systems or the like), a latent image charge pattern is formed on a uniformly charged photoconductive or dielectric member. Pigmented marking particles (toner) are attracted to the latent image charge pattern to develop this image on the photoconductive or dielectric member. A receiver member, such as paper, is then brought into contact with the dielectric or photoconductive member and an electric field applied to transfer the marking particle developed image to the receiver member from the photoconductive or dielectric member. After transfer, the receiver member bearing the transferred image is transported away from the dielectric member to a fusion station and the image is fixed or fused to the receiver member by heat and/or pressure to form a permanent reproduction thereon. The receiving member passes between a pressure roll and a heated fuser roll or element.

A fuser member having a long life is desirable.

SUMMARY

According to an embodiment, a method for the production of a fuser member is provided. The method includes obtaining a substrate and positioning a fluoroplastic layer around the substrate. The outer surface of the fluoroplastic layer is roughened to a surface roughness of between about 0.03 μm Ra and about 3 μm Ra. The outer surface is coated with a functional silicone oil.

According to an embodiment, there is provided a fuser member comprising a substrate, an intermediate layer disposed on the substrate; and a fluoroplastic layer disposed on the intermediate layer. The outer surface of the fluoroplastic layer has a surface roughness of between about 0.03 μm Ra and about 3 μm Ra. A functional silicone oil is applied to the outer surface.

According to an embodiment, there is provided a fuser member comprising a substrate and an intermediate layer disposed on the substrate, wherein the intermediate layer comprises an elastomer selected from the group consisting of silicone rubbers, high temperature vulcanization silicone rubbers, low temperature vulcanization silicone rubbers, liquid silicone rubbers, and siloxanes. A fluoroplastic layer is disposed on the intermediate layer having a thickness of from about 10 microns to about 350 microns, wherein an outer surface of the fluoroplastic layer comprises a surface roughness of between about 0.03 μm Ra and about 3 μm Ra. The fluoroplastic layer has a surface resistivity of less than about $10^9$ Ω/square. A functional silicone oil is applied to the outer surface.

BRIEF DESCRIPTION OF THE DRAWINGS

The accompanying drawings, which are incorporated in and constitute a part of this specification, illustrate several embodiments of the present teachings.

FIG. 1 is a schematic of an embodiment of a fuser roller.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

FIG. 1 is a schematic view of an embodiment of a fuser member 100, demonstrating various possible layers. As shown in FIG. 1, a substrate 110 has an intermediate or cushioning layer 120 thereon. Intermediate or cushioning layer 120 can be, for example, a silicone rubber. On intermediate layer 120 is an outer layer 130, for example, a fluoroplastic.

Fuser rolls used in electrophotographic marking systems generally comprise a substrate 110 shown herein as a core cylinder having one or more intermediate layers 120 such as silicone. The intermediate layer 120 can include silicone rubbers such as room temperature vulcanization (RTV) silicone rubbers, high temperature vulcanization (HTV) silicone rubbers, low temperature vulcanization (LTV) silicone rubbers and liquid silicone rubbers (LSR). These rubbers are known and readily available commercially, such as SILASTIC® 735 black RTV and SILASTIC® 732 RTV, both from Dow Corning; and 106 RTV Silicone Rubber and 90 RTV Silicone Rubber, both from General Electric. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

Optionally, any known and available suitable adhesive layer may be positioned between the intermediate layer 120, the outer layer 130 and the substrate 110. Examples of suitable adhesives include silanes such as amino silanes (such as, for example, HV Primer 10 from Dow Corning), titanates, zirconates, aluminates, and the like, and mixtures thereof.

An exemplary embodiment of the outer layer 130 include fluoroplastics. Fluoroplastics have been used as the topcoat materials for oil-less fusing for their good releasing property. PFA and PTFE, the most representative fluoroplastics for fusing applications, are chemically and thermally stable and possess a low surface energy. Examples of fluoroplastics include polytetrafluoroethylene (PTFE); perfluoroalkoxy polymer resin (PFA); copolymers of polytetrafluoroethylene and perfluoromethylvinylether, and mixtures thereof. The fluoroplastics provide chemical and thermal stability and have a low surface energy. In embodiments, these fluoroplastic layers contain at least 65 volume percent fluoroplastic, depending on electrical conductivity, wear and release requirements.

In some embodiments, the intermediate layer 120 includes silicone. Alternatively, the intermediate layer 120 may comprise components other than silicone. In embodiments, the intermediate layer contains at least about 30 volume percent, or at least about 50 volume percent silicone, or at least 70 volume percent silicone, depending on thermal conductivity requirements.

The thickness of the outer fluoroplastic layer 130 of the fuser member 100 herein is from about 10 microns to about 350 microns, or from about 15 microns to about 100 microns, or from about 20 to 80 microns.

Examples of suitable substrate 110 materials include, in the case of roller substrate, metals such as aluminum, stainless steel, steel, nickel and the like. In embodiments, the substrate material can include polymers such as polyimides, polyamideimides, polyetherimides, polyether ether ketones and polyphenylene sulfides.

When a fluoroplastic layer is used to manufacture a fuser roller, there are several methods that can be used. A first method involves obtaining a substrate and positioning a fluoroplastic layer around an outer surface of the substrate. An elastomer is injected between the outer surface of the substrate and an inner surface of the layer to form a fuser member. The silicone is cured in the mold and then demolded.

A second method involves positioning a fluoroplastic sleeve around a substrate having an elastomeric layer thereon. The layer and substrate are heated to a temperature to cause the fluoroplastic layer to shrink and thereby form a fuser member. In embodiments, a primer layer is included between the intermediate layer and the fluoroplastic layer.

In the methods of manufacturing fuser members described above, the inner surface of the fluoroplastic layer can be etched to increase adhesion. In addition, the outer surface of the substrate can be roughened to increase adhesion with the elastomer and/or primer layers.

A third method is coating the fluoroplastic layer by spray or flow coating. Fluoroplastic layers are typically used to minimize oil use in electrophotographic machines when compared with fluoroelastomer surfaces, since they have better releasing characteristics. Also the cost of the fluoroplastic coating construction is usually advantaged over fluoroelastomer coatings.

The smooth, extruded surface of the conductive fluoroplastic layers, for example PFA, can exhibit difficult stripping, showing stripper finger defects in the print at time zero and even past 500,00 prints. It has been discovered that by roughening the fluoroplastic roll surface and pretreating the roll surface with a functional oils, the stripping is improved.

Specifically, the roughened surface of the fluoroplastic layer is wiped or coated with functional silicone oil before use to reduce the stripping force from the point where stripper finger artifacts are at a low (non-objectionable) level. After the initial wipe or coating no further oil is applied to the fuser surface. Unexpectedly, the improved stripping performance has lasted past 1,000,000 prints.

The functional silicone oil useful in embodiments is a composition, for example, containing a mixture of a mercapto functionalized silicone oil compound in an effective amount, for example, from about 0.1 to about 30 percent by weight and a second non-mercapto functionalized oil, such as polydimethyl silicone oil in an effective amount of, for example, about 99.9 to about 70 percent by weight. The second polydimethyl silicone oil compound can be selected from the group consisting of known non functional silicone oils including an amino functional siloxane, phenyl methyl siloxane, trifluoropropyl functional siloxane, and a non functional silicone oil or polydimethylsiloxane oil. The functional oil is described more fully in U.S. Pat. No. 5,395,725, incorporated by reference herein.

The surface of this fuser roll can be roughened by sanding, polishing, knurling, blasting, beading or the like. The surface roughness of the outer surface of the fluoroplastic sleeve is between about 0.03 μm Ra and about 3 μm Ra, or from about 0.04 μm Ra and about 2.5 μm Ra, or from about 0.05 μm Ra and about 2 μm Ra.

Examples of conductive particles or fillers that can be included in the fluoroplastic sleeve or the elastomer or cushioning layer include carbon nanotubes (CNT); carbon blacks such as carbon black, graphite, acetylene black, graphite, grapheme, fluorinated carbon black, and the like; metal, metal oxides and doped metal oxides, such as tin oxide, antimony dioxide, antimony-doped tin oxide, titanium dioxide, indium oxide, zinc oxide, indium oxide, indium-doped tin trioxide, silicon carbide, metal carbide and the like; and mixtures thereof. The conductive particles may be present in an amount of from about 0.1 volume percent to about 30 volume percent, or from about 0.5 volume percent to about 20 volume percent, or from about 1 volume percent to about 10 volume t percent of total solids to the fluoroplastic in the sleeve. The intermediate layer typically has from about 15 volume percent to about 50 volume percent of conductive particles or fillers, or from about 20 volume percent to about 45 volume percent of conductive particles or fillers or from about 25 volume percent to about 35 volume percent of conductive particles or fillers.

Optionally, any known and available suitable adhesive or primer layer may be positioned between the intermediate layer 120, the fluoroplastic sleeve 130 and the substrate 110. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be applied to the substrate. The adhesive layer can be coated on the substrate, or on the outer layer, to a thickness of from about 2 nanometers to about 2,000 nanometers, or from about 2 nanometers to about 500 nanometers for a silane adhesive. Commercially available adhesives can have the above agents in an elastomer rich solution. When this occurs the thickness of the adhesive layer is from about 1 microns to about 50 microns, or from about 2 microns to about 5 microns. The adhesive can be coated by any suitable known technique, including spray coating or wiping.

The Young's Modulus of the fluoroplastic sleeve 130 is from about 50 kpsi to about 100 kpsi, or from about 70 kpsi to about 95 kpsi, or from about 85 kpsi to about 95 kpsi. The tensile stress in the outer layer is from about 1000 psi to about 5000 psi, or from about 2000 psi to about 4000 psi, or from about 2700 psi to about 3300 psi. This fuser member 100 described herein exhibits as surface conductivity of less than about $10^9$ Ω/square. However, there are applications where non-electrically conductive sleeves are used and the surface conductive is greater than about $10^{14}$ Ω/square.

Examples

The outer surface of a PFA (perfluoroalkoxy polymer resin) sleeve was sanded lightly with 15 um aluminum oxide micro-finishing media. The roughness of the surface after sanding was about 0.03 to about 5.0 μm Ra. The surface was wiped with fuser shield, an amino silicone oil and fuser agent II, a mercapto silicone oil. A matrix of oiled and dry rolls was run with various papers and a solid black near the lead edge of the print. The "dry" sanded rolls had poor stripping performance while the sanded and oiled rolls had acceptable stripping. Table 1 is a summary of the results.

TABLE 1

| | 30 Shore A | 60 Shore A |
|---|---|---|
| Sand - Not pre-oiled | Hard Stripping-Fail | Hard Stripping-Waves |
| Sand - Pre-oiled | VL Good stripping | VL Good stripping |

Table 1 shows that a roughened pre-oiled outer surface of a fluoroplastic layered fuser roll provides good initial performance. An unexpected result is the good stripping (low level of paper distortion and stripper finger marks in the print) lasts without the addition of additional oil for at greater than 500,000 prints. This is an unexpected result.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for the production of a fuser member comprising:

obtaining a substrate;

positioning a fluoroplastic layer around the substrate;

conditioning an outer surface of the fluoroplastic layer to a surface roughness of between about 0.03 μm Ra and about 5 μm Ra; and oiling the outer surface with a functional silicone oil prior to use in an electrophotographic apparatus, wherein no further functional silicone oil is provided to the outer surface while in the electrophotographic apparatus.

2. The method of claim 1 wherein the functional silicone oil comprises an oil blend composition comprising at least one mercapto functional silicone and at least one non-mercapto silicone oil.

3. The method of claim 1 wherein said fluoroplastic layer comprises a polymer selected from the group consisting of polytetrafluoroethylene (PTFE), perfluoroalkoxy polymer resin (PFA), copolymers of polytetrafluoroethylene and perfluoromethylvinylether and mixtures thereof.

4. The method of claim 1 wherein the fluoroplastic layer further comprises conductive fillers.

5. The method of claim 4 wherein the conductive fillers are selected from the group consisting of carbon nanotubes, carbon black, acetylene black, graphite, graphene, metal, metal oxide, doped metal oxides, silicon carbide and metal carbide.

6. The method of claim 1 wherein the substrate is selected from the group consisting of aluminum, stainless steel, steel, nickel, polyimide, polyamideimide, polyetherimide, polyether ether ketone and polyphenylene sulfide.

7. The method of claim 1 wherein an outer surface of the substrate has been roughened.

8. The method of claim 1 further comprising:

providing an adhesive layer disposed between the fluoroplastic layer and the substrate.

9. The method of claim 1 further comprising;

providing a intermediate layer between the fluoroplastic layer and the substrate.

10. The method of claim 9 wherein the intermediate layer comprises an elastomer selected from the group consisting of silicone rubbers, vulcanized silicone rubbers, liquid silicone rubbers and siloxanes.

11. The method of claim 1 wherein the fluoroplastic layer comprises a sleeve.

12. A fuser member comprising:

a substrate:

an intermediate layer disposed on the substrate;

a fluoroplastic layer disposed on the intermediate layer wherein the outer surface of the fluoroplastic layer has a surface roughness of between about 0.03 μm Ra and about 3 μm Ra; and a functional silicone oil disposed on the outer surface prior to use in an electrophotographic apparatus, wherein the functional silicone oil comprises an oil blend composition comprising at least one mercapto functional silicone and at least one non-mercapto silicone oil.

13. The fuser member of claim 12 wherein said fluoroplastic layer comprises a polymer selected from the group consisting of polytetrafluoroethylene (PTFE), perfluoroalkoxy polymer resin (PFA), copolymers of polytetrafluoroethylene and perfluoromethylvinylether and mixtures thereof.

14. The fuser member of claim 12 wherein the fluoroplastic layer further comprises conductive fillers.

15. The fuser member of claim 14 wherein the conductive fillers are selected from the group consisting of carbon nanotubes, carbon black, acetylene black, graphite, graphene, metal, metal oxide, doped metal oxides, silicon carbide and metal carbide.

16. The method of claim 12 wherein the substrate is selected from the group consisting of aluminum, stainless steel, steel, nickel, polyimide, polyamideimide, polyetherimide, polyether ether ketone and polyphenylene sulfide.

17. The fuser member of claim 12 further comprising:

an adhesive layer disposed between the fluoroplastic layer and the intermediate layer.

18. The fuser member of claim 12 wherein the intermediate layer is selected from the group consisting of silicone rubbers, vulcanized silicone rubbers, liquid silicone rubbers and siloxanes.

19. An electrophotographic apparatus comprising:

a photoconductive member for receiving a latent image;

a development component for applying toner to the latent image for developing the latent image;

a transfer component for transferring the developed latent image to a receiver member;

a fuser station for fixing the developed latent image to the receiver member wherein the fusing station includes a fuser member comprising;

a substrate;

an intermediate layer disposed on the substrate wherein the intermediate layer comprises an elastomer selected from the group consisting of silicone rubbers, vulcanized silicone rubbers, and siloxanes;

a fluoroplastic layer is disposed on the intermediate layer, wherein the fluoroplastic layer has a thickness of from about 10 microns to about 350 microns, wherein an outer surface of the fluoroplastic layer comprises a surface roughness of between about 0.03 μm Ra and about 3 μm Ra and wherein the fluoroplastic layer has a surface resistivity of less than about $10^9$ Ω/square; and a functional silicone disposed on the outer surface prior to use in an electrophotographic apparatus, wherein no further functional silicone oil is provided to the outer surface while in the electrophotographic apparatus.

* * * * *